United States Patent
Tanaka

[11] Patent Number: 5,988,247
[45] Date of Patent: Nov. 23, 1999

[54] PNEUMATIC TIRE WITH CROWN REINFORCING RUBBER LAYER AND SIDE REINFORCING RUBBER LAYERS

[75] Inventor: Masatoshi Tanaka, Takarazuka, Japan

[73] Assignee: Sumitomo Rubber Industries, Ltd., Hyogo-ken, Japan

[21] Appl. No.: 08/971,360

[22] Filed: Nov. 17, 1997

[51] Int. Cl.$^6$ .................................................. B60C 17/00
[52] U.S. Cl. .................... 152/517; 152/549; 152/550; 152/555; 152/564
[58] Field of Search .................................. 152/517, 549, 152/555, 564, 550

[56] References Cited

U.S. PATENT DOCUMENTS 5,427,166  6/1995  Willard, Jr. .......................... 152/517 X
5,685,927  11/1997  Hammond et al. .................. 152/517 X

FOREIGN PATENT DOCUMENTS 2 138 367  10/1984  United Kingdom .................. 152/517

*Primary Examiner*—Adrienne C. Johnstone

[57] ABSTRACT

A pneumatic tire, more particularly a run flat tire, comprises at least three radial carcass plies each extending between bead portions through a tread portion and sidewall portions, the tread portion is provided between the radially outermost carcass ply and radially inner next carcass ply with a crown reinforcing rubber layer so that at least two carcass plies are disposed radially inside the crown reinforcing rubber layer, and each of the sidewall portions is provided between the axially innermost carcass ply and axially outer next carcass ply with a side reinforcing rubber layer so that at least two carcass plies are disposed axially outside the side reinforcing rubber layer. The reinforcing rubber layers are preferably made of a low heat generation rubber having a complex elastic modulus of 8 to 15 Mpa, and a loss tangent of 0.03 to 0.08. The complex elastic modulus of the side reinforcing rubber layer is preferably less than that of the crown reinforcing rubber layer.

11 Claims, 4 Drawing Sheets

5,988,247

PNEUMATIC TIRE WITH CROWN REINFORCING RUBBER LAYER AND SIDE REINFORCING RUBBER LAYERS

BACKGROUND OF THE INVENTION

The present invention relates to a pneumatic tire more particularly to a run flat tire.

In order to maintain safe running when the tire is punctured, various propositions have been made.

FIG. 3 shows typical of such propositions, where the sidewall portion (d) is provided between the carcass (f) and inner liner (i) of airtight rubber with a reinforcing layer (g). This reinforcing layer (g) is made of a vast volume of rubber to support the tire load mainly by itself. Therefore, the ride comfort is sacrificed, and the tire weight is inevitably increased to worsen the fuel consumption, which goes against the times.

FIG. 4 shows another proposition, where two reinforce rubber layers (g1) and (g2) are disposed between three plies (f1, f2 and f3) of the carcass (f) in the sidewall portion (d). In this case, it can be possible to reduce the rubber volume if the target load supporting power is the same level as of FIG. 3. In practice, however, it is difficult to attain a sufficient load supporting power even if the same or more volume of rubber.

Further, even if the sidewall portions are fully reinforced by such reinforcing layers (g, g1, g2) at the sacrifice of the tire weight, ride comfort and the like, it is very difficult to improve run flat performance especially to increase the runable distance, because the tire shoulder portions or buttress portions, which are usually a weakest portion of the tire, contact with the ground at high ground pressure and rapidly fatigued and worn and thus easily broken.

BRIEF SUMMARY OF THE INVENTION

It is therefore, an object of the present invention to provide a pneumatic tire improved in run flat performance without sacrificing the ride comfort and tire weight.

According to one aspect of the present invention, a pneumatic tire comprises a tread portion, a pair of sidewall portions, a pair of bead portions, a carcass comprising at least three radial plies each extending between the bead portions through the tread portion and sidewall portions, the tread portion provided between the radially outermost carcass ply and radially inner next carcass ply with a crown reinforcing rubber layer so that at least two carcass plies are disposed radially inside the crown reinforcing rubber layer, and each sidewall portion provided between the axially innermost carcass ply and axially outer next carcass ply with a side reinforcing rubber layer so that at least two carcass plies are disposed axially outside the side reinforcing rubber layer.

Therefore, the crown reinforcing rubber layer and carcass plies disposed radially inside thereof display strong resistance to such a bending deformation that the tread center becomes hollow. Therefore, the tire shoulder portions or buttress portions are prevented from contacting with the ground when the tire is punctured, and the ground pressure is maintained even in the tread center. As the vending deformation of the tread portion is minimized, it becomes possible to greatly reduce the volume of the side reinforcing rubber layer in comparison with the prior arts.

Preferably, the reinforcing rubber layers are made of a low heat generation rubber having a complex elastic modulus of 8 to 15 MPa, and a loss tangent of 0.03 to 0.08. The complex elastic modulus of the side reinforcing rubber layer is less than the complex elastic modulus of the crown reinforcing rubber layer. The axial width of the crown reinforcing rubber layer is 0.7 to 1.2 times the ground contacting width. The radial extent of the side reinforcing rubber layer is 0.2 to 1.2 times the ground contacting width. The thickness of the crown reinforcing rubber layer gradually decreases towards its axial ends from the center, and the maximum thickness is in the range of from 2 to 10%, preferably 2.5 to 6% of the ground contacting width.

Here, the ground contacting width is defined as the maximum axial width the ground contacting region when the tire is mounted on a standard rim, inflated to a normal pressure and loaded with a standard load which are specified by standardizing organization such as JATMA (Japan), TRA (USA), ETRTO (Europe) and the like.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
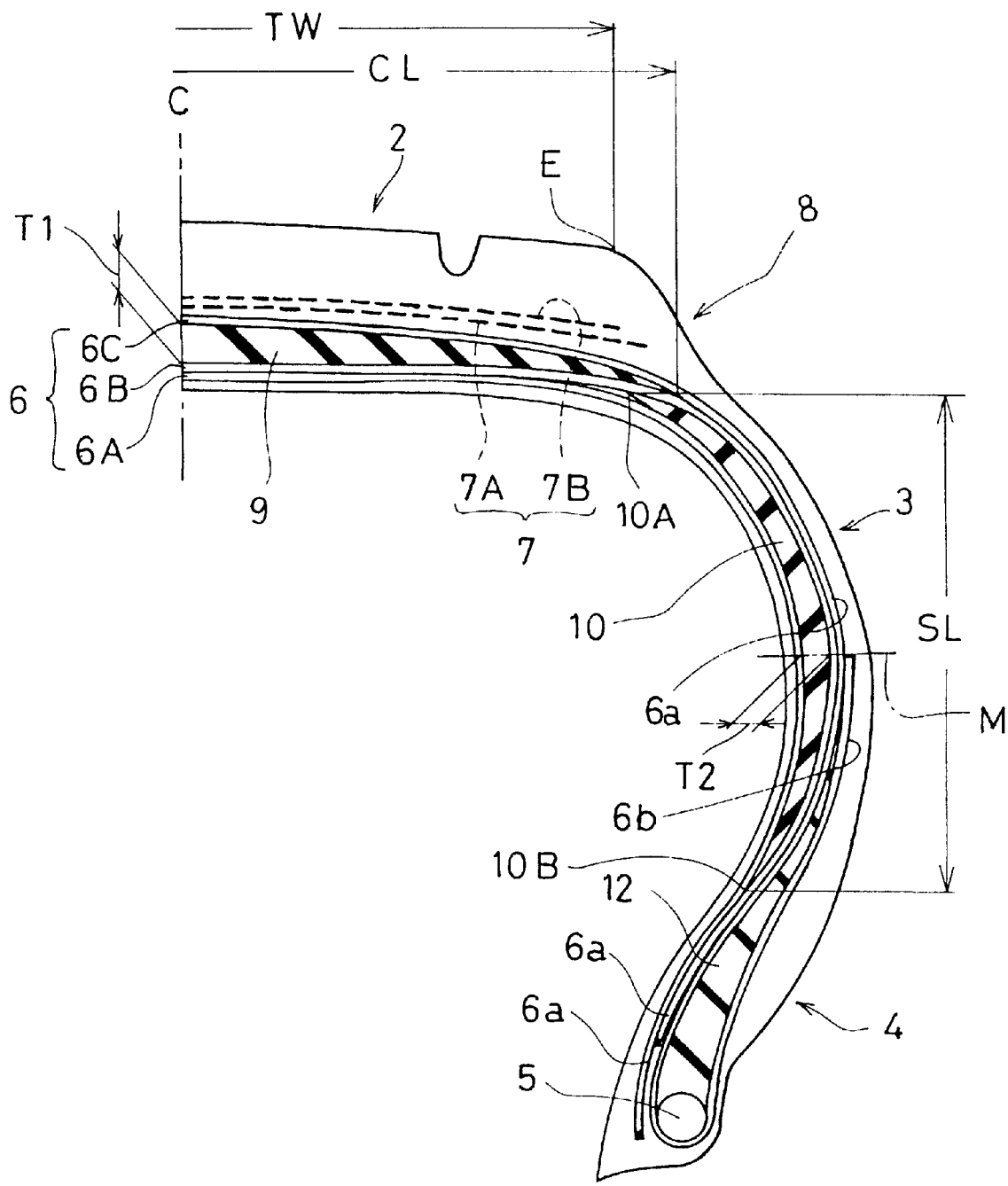
FIG. 1 is a cross sectional view of an embodiment of the present invention.
Figure 2:
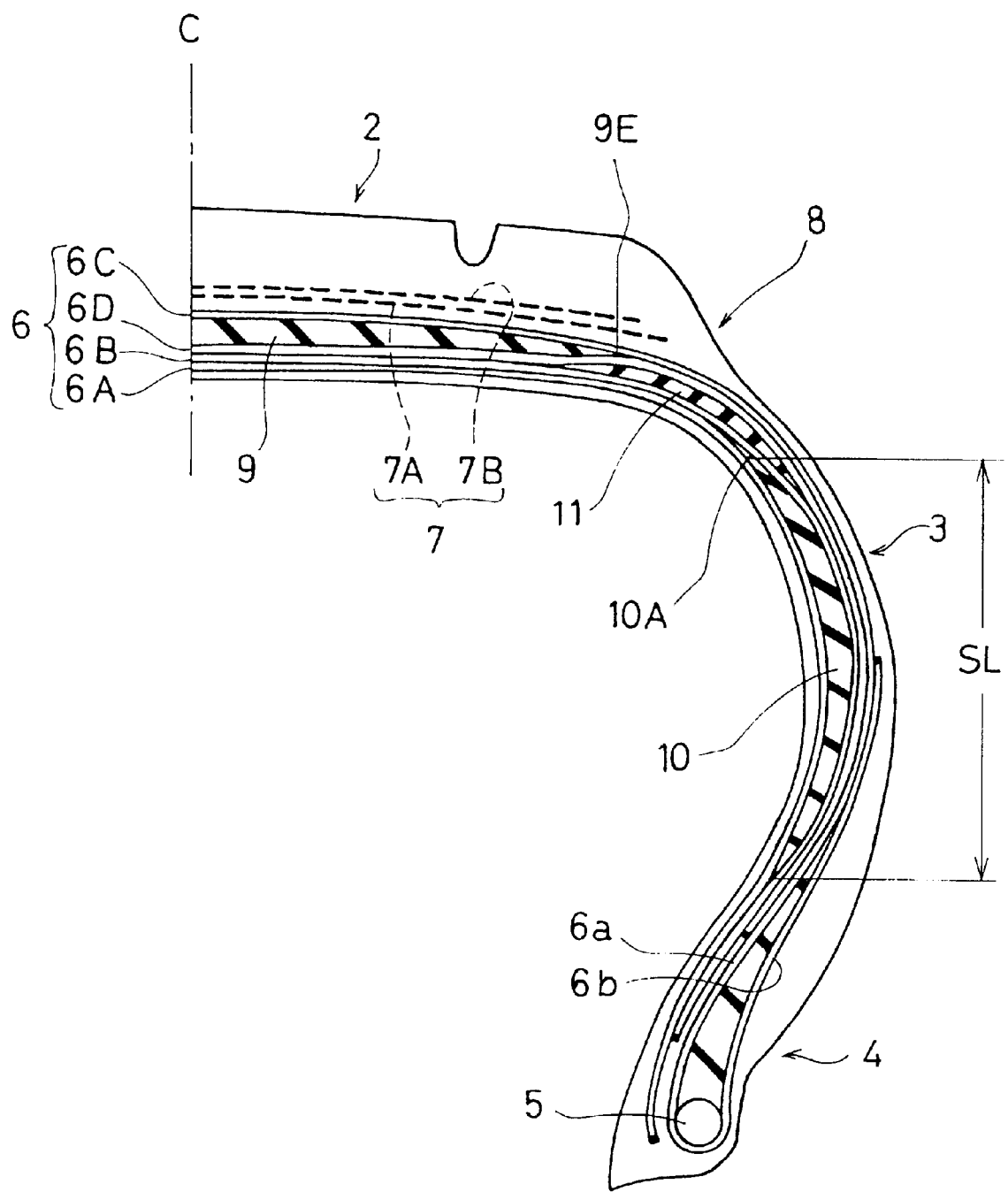
FIG. 2 is a cross sectional view of another embodiment of the present invention.

In FIGS. 1 and 2, the pneumatic tires according to the present invention are in a normal inflated condition in which the tire is mounted on a standard rim and inflated to a standard pressure but loaded with no tire load.

The tire comprises a tread portion 2, a pair of axially spaced bead portions 4 with a bead core 5 therein, a pair of sidewall portions 3 extending between the tread edges and the bead portions, a carcass 6 extending between the bead portions 4, and a belt 7 disposed radially outside the carcass 6 in the tread portion.

The belt 7 comprises two plies 7A and 7B of cords laid at an angle of 10 to 35 degrees to the tire equator C for example, in parallel with each other in each ply but crosswise to the next ply. For the belt cords, high modulus cords, e.g. steel cords, aromatic polyamide and the like are preferably used.

The carcass 6 comprises at least three plies 6A, 6B and 6C of cords arranged radially at an angle of 90 to 65 degrees with respect to the tire equator C. Fro the carcass cords, steel cords and organic fiber cords, e.g. polyester, rayon and the like can be used.

In the embodiments shown in FIGS. 1 and 2, the carcass ply 6C is outermost and extends between the bead portions 4 and it is turned up around the bead cores 5 from the axially inside to outside of the tire to form a pair of turnup portions 6b and a main portion 6a therebetween. The carcass ply 6A is innermost and the carcass ply 6B is therebetween. The plies 6A and 6B extend between the bead portions 4 but they are not turned up around the bead cores 5 and terminate in the respective bead portions and on the axially inside of the bead cores 5.

Further, in each of the bead portions 4, a bead apex 12 made of a hard rubber compound is disposed between the main portion 6a and turnup portion 6b of the carcass ply 6C. The bead apex 12 tapers radially outward from the bead core 5.

The tread portion 2 is provided between the radially outermost carcass ply 6C and the radially inner next carcass ply with a crown reinforcing rubber layer 9. The axial width CL of the crown reinforcing rubber layer 9 is 0.7 to 1.2 times the ground contacting width TW. The thickness of the crown reinforcing rubber layer 9 gradually decreases towards its axial ends from the center or the tire equator C, and the thickness T1 at the tire equator C is in the range of from 2 to 10%, preferably 2.5 to 6% of the ground contacting width TW.

Accordingly, the assembly of the crown reinforcing rubber layer 9 and the carcass plies adjacent radially outwardly and inwardly thereto can resists to the bending deformation. Further, the resists to the bending deformation effectively increased to prevent the buttress region 8 from contacting with the ground, without deteriorating the ride comfort and increasing the tire weight, because the number of the carcass plies is larger on the radially inside of the reinforcing rubber layer, that is, on the side where a large tensile stress is produced when the tire on a car is punctured, than the other side, and further, the thickness is increased in the center where the compressive stress is larger when the tire is punctured.

The above-mentioned sidewall portion 3 is provided between the innermost carcass ply 6A and the axially outer next carcass ply 6B with a side reinforcing rubber layer 10. The side reinforcing rubber layer 10 tapers towards its radially outer end 10A and inner end 10B. Thus, it has a substantially crescent sectional shape, and the maximum thickness T2 lying in the middle thereof in the tire radial direction is set in the range of from 2 to 10% preferably 2.5 to 6% of the ground contacting width TW. Preferably, the maximum thickness T2 occurs in the maximum tire section width position M. The radial extent SL of the side reinforcing rubber layer 10 measured radially between the radially outer end 10A and inner end 10B is 0.2 to 1.2 times, preferably 0.3 to 0.5 times the ground contacting width TW. The radially inner end 10B of the side reinforcing rubber layer 10 overlaps the radially outer end of the bead apex 12.

In FIG. 1, the radially outer end 10A of the side reinforcing rubber layer 10 overlaps the axial ends of the crown reinforcing rubber layer 9 and the belt 7. Accordingly, similarly to the crown reinforcing rubber layer 9, the assembly of the side reinforcing rubber layer 10 and the carcass plies adjacent axially outwardly and inwardly thereto resists to the bending deformation. Further, the resists to the bending deformation effectively increased to prevent the inner surface of the sidewall portion from rubbing against itself and thus to prevent the heat damage, without deteriorating the ride comfort and increasing the tire weight, because the number of the carcass plies is larger on the axially outside of the reinforcing rubber layer, that is, on the side where a large tensile stress is produced when the tire on a car is punctured, than the other side, and further, the thickness is increased in the center where the compressive stress is larger when the tire is punctured. As explained above, as the crown reinforcing rubber layer 9 is disposed and at least two carcass plies are disposed along the axially outside of the side reinforcing rubber layer 10, it is possible to decrease the volume of the side reinforcing rubber layer 10, and thus a remarkable tire weight reduction is possible in comparison with the prior arts.

If the thickness T2 is less than 2% of TW, the resistance to bending deformation of the side reinforcing rubber layer 10 becomes insufficient. If the thickness T2 is more than 10% of TW, the heat generation tends to increase to decrease the durability and also the ride comfort is liable to deteriorate.

The crown reinforcing rubber layer 9 and the side reinforcing rubber layer 10 are made of a low-heat-generation rubber whose complex elastic modulus E* is 8 to 15 MPa preferably 8 to 12 MPa, and loss tangent (tan $\delta$) is 0.03 to 0.08 preferably 0.05 to 0.08. Therefore, the tread portion 2 and sidewall portion 3 are provided with a bending rigidity necessary for a long-distance run flat, maintaining ride comfort to some degree. If the complex elastic modulus E* is less than 8 MPa, the bending rigidity becomes insufficient. If the complex elastic modulus E* is more than 15 MPa, the ride comfort during normal running is liable to be deteriorated. If the loss tangent (tan $\delta$) is more than 0.08, the heat generation increases and the run flat ability decreases. If the loss tangent (tan $\delta$) is less than 0.03, the ride comfort tends to deteriorate.

In view of the ride comfort in normal use, it is preferable that the reinforcing rubber layer disposed nearer to the bead portion 4 has a smaller complex elastic modulus E*. For example, the complex elastic modulus E1* of the crown reinforcing rubber layer 9 is 12 MPa, and the complex elastic modulus E2* of the side reinforcing rubber layer 10 is 8 MPa.

Although the reinforce rubber layers are disposed, since turned-up in the bead portion is only one carcass ply, an excessive increase in bending rigidity near the bead portion can be avoided and ride comfort in normal use can be maintained.

The complex elastic modulus E* and the loss tangent (tan $\delta$) are measured with a viscoelastic spectrometer of IWA-MOTO SEISAKUSYO make using a specimen of 4 mm width ×30 mm length ×1.5 mm thickness. The measuring conditions are as follows:

Temperature: 70 deg. C.

Frequency: 10 Hz

Initial strain: 10%

Dynamic distortion: plus/minus 2%

In FIG. 2 showing another embodiment of the present invention, in addition to the above-mentioned carcass plies 6A–6C, the carcass 6 further comprises a carcass ply 6D which is disposed between the carcass plies 6C and 6B. The carcass ply 6D is not turned up and terminates in the lower sidewall portion, though the carcass plies 6A and 6B are terminated in the bead portion as explained above.

In this embodiment and also the former embodiment, the terminal ends of the carcass plies which are not turned up are such that the axially inner the carcass ply position, the radially inner the terminal end position.

In this embodiment, a buttress reinforcing rubber layer 11 is further disposed between the carcass plies 6B and 6D in the buttress region 8. Corresponding to this arrangement, the radially outer end 10A of the side reinforcing rubber layer 10 is disposed at a relatively lower height in comparison with the former example and thus spaced apart from the axial end 9E of the crown reinforcing rubber layer 9. In this space, the buttress reinforcing rubber layer 11 is disposed. As shown in FIG. 2, both the ends are tapered and overlap with the axial end 9E of the crown reinforcing rubber layer 9 and the radial outer end 10A of the side reinforcing rubber layer 10.

The complex elastic modulus E3* and loss tangent (tan $\delta$) of the buttress reinforcing rubber layer 11 are also set in the same ranges as for the crown and side reinforcing rubber layers 9 and 10. It is preferable for the ride comfort in normal use to gradually decrease the complex elastic modulus from the tire equator toward the bead portion, that is, $E1^* > E3^* > E2^*$.

When viewed along the carcass from the tire equator to the bead portion, the positions of the reinforcing rubber layers 9, 11, 10 are changed from outside to inside of the tire within the thickness of the carcass. In other words, the number of the carcass plies adjacent to the outside of the reinforcing rubber layer is gradually increased, but the number of the carcass plies adjacent to the inside of the reinforcing rubber layer is gradually decreased. Thus, according to the direction of bending deformation when the tire on a car is punctured, the tire is effectively reinforced by the assembly of the reinforcing rubber layers and carcass plies.

The buttress region 8 is effectively reinforced by the assembly of the buttress reinforcing rubber layer 11, two carcass plies 6C and 6D adjacent to the outside thereof and two carcass plies 6A and 6B adjacent to the inside thereof which shows strong resistance against both the inward and outward bending deformation.

This arrangement is therefore, suitably applied to pneumatic tires for relatively heavy vehicles such as light truck, recreational vehicle and the like, and also real heavy duty vehicles such as buses, trucks and the like.

Comparison Tests

Test tires having specifications given in Table 1 were made, and the following tests were carried out.

Tire size: 225/60R16 97H (TW=185 mm)
Rim size: 16X7JJ

A) Run Flat Performance Test

A test car, Japanese 4000 cc car provided on all the wheels with test tires in which the front right tire is decreased to zero pressure was run at a speed of 80 km/H, and the running distance until the tire was broken was measured.

B) Ride Comfort Test

Using the above-mentioned test car of which all the tires were inflated to a normal pressure of 2.0 kgf/sq.cm, the ride comfort was evaluated into five ranks by the driver's feeling.

The test results are also shown in Table 1.

It was confirmed from the test results that the tires according to the present invention can be remarkably improved in the run flat performance, with maintaining or improving the ride comfort and tire weight.

TABLE 1

Figure 3:
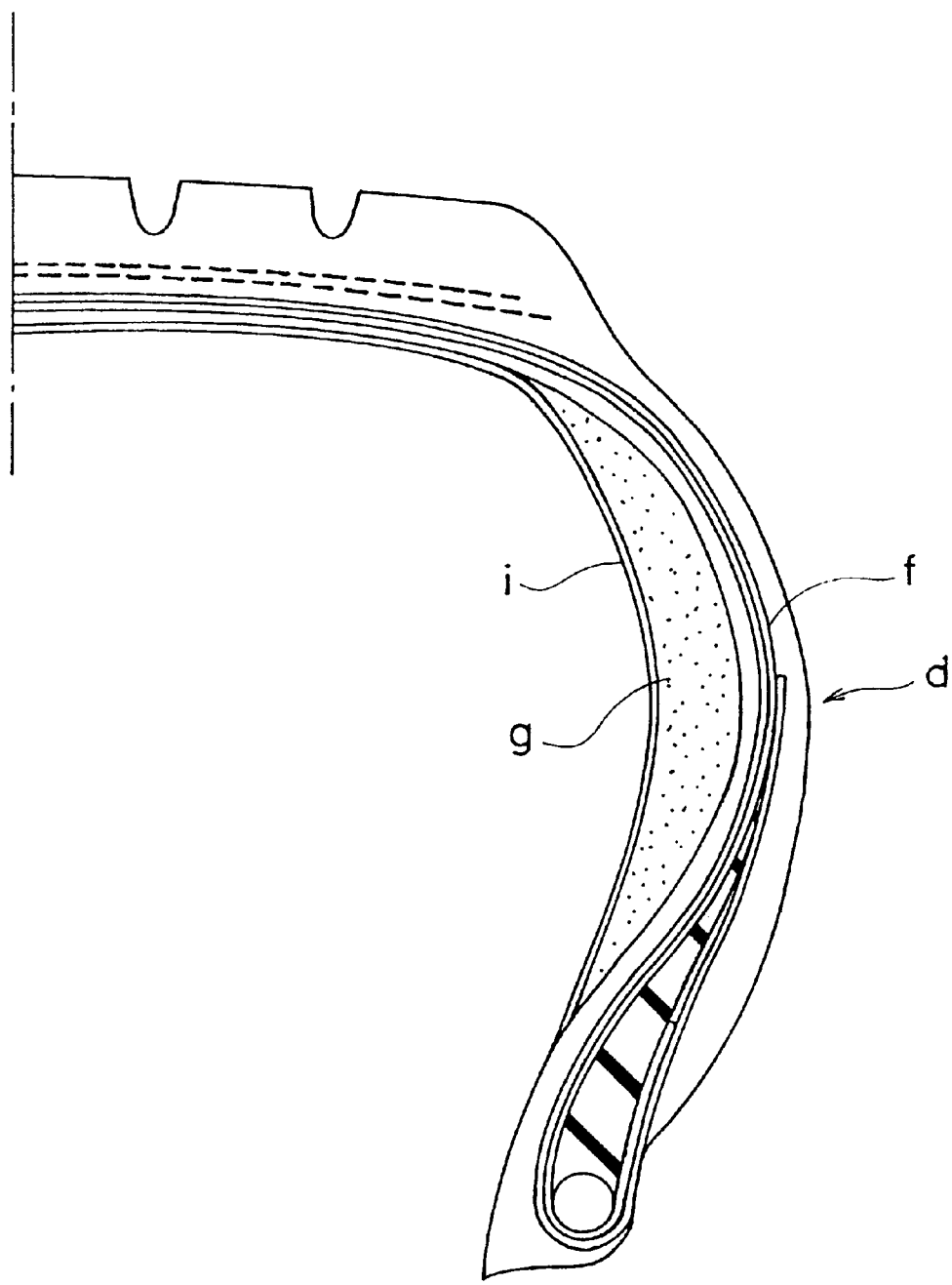
FIGS. 3 and 4 are cross sectional views of prior art tires.
Figure 4:
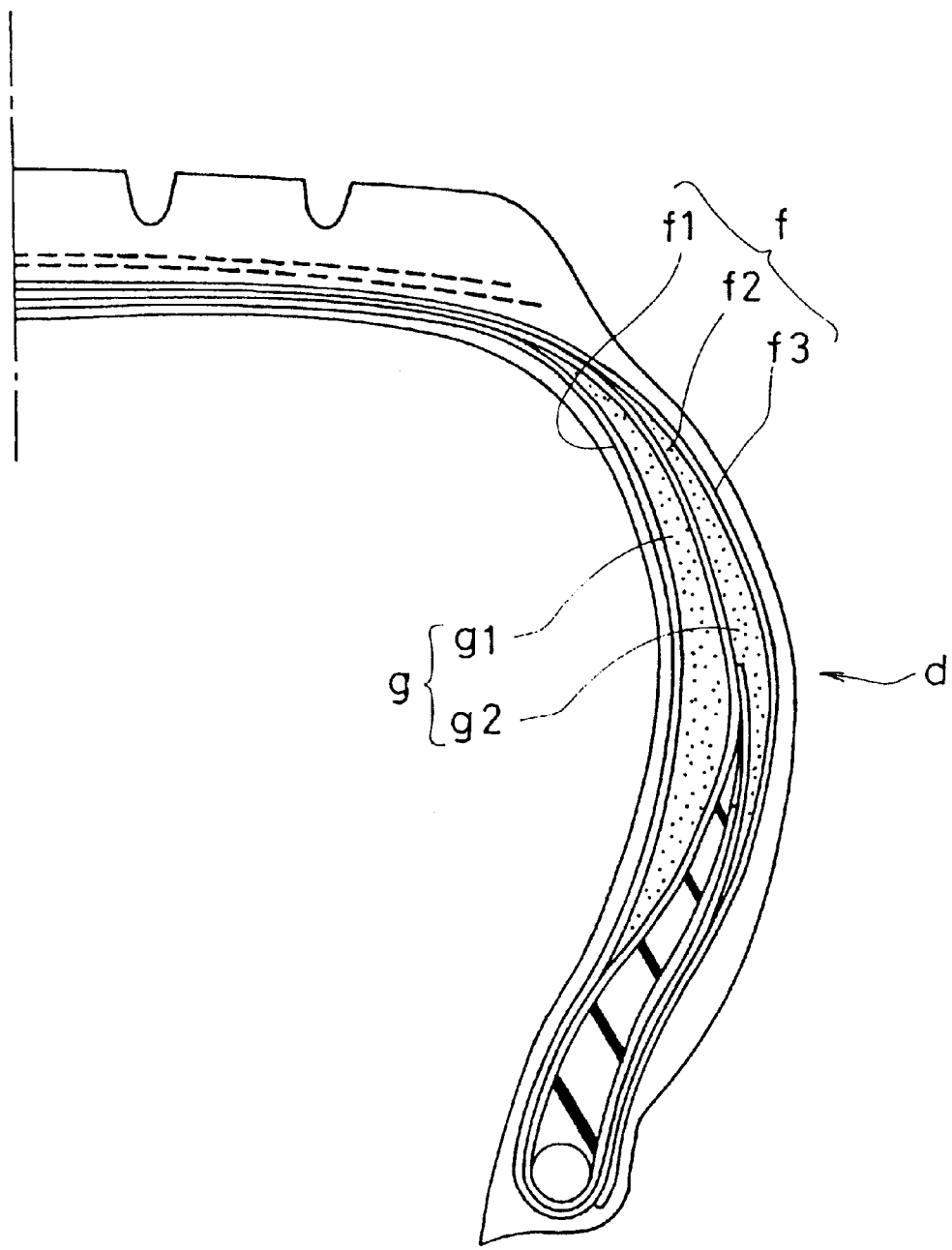

| Tire Structure | Ex. 1 FIG. 1 | Ex. 2 FIG. 1 | Ref. 1 FIG. 3 | Ref. 2 FIG. 3 | Ex. 3 FIG. 2 | Ref. 3 FIG. 4 |
|---|---|---|---|---|---|---|
| Carcass | | | | | | |
| No. of ply | 3 | 3 | 3 | 3 | 4 | 3 |
| Cord material | | | polyester | | | |
| Cord angle | | | 90 degrees | | | |
| Belt | | | | | | |
| No. of ply | | | 2 | | | |
| Cord material | | | steel | | | |
| Cord angle | | | 24 degrees | | | |
| Reinforcing layer | | | | | | |
| Crown | | | | | | |
| CL(mm) | 205 | 205 | | | 185 | |
| T1(mm) | 6 | 6 | | | 5 | |

TABLE 1-continued

| Tire Structure | Ex. 1 FIG. 1 | Ex. 2 FIG. 1 | Ref. 1 FIG. 3 | Ref. 2 FIG. 3 | Ex. 3 FIG. 2 | Ref. 3 FIG. 4 |
|---|---|---|---|---|---|---|
| E1*(MPa) | 12 | 12 | non | non | 12 | non |
| tan δ | 0.1 | 0.1 | | | 0.1 | |
| CL/TW | 1.1 | 1.1 | | | 1 | |
| T1/TW(%) | 3.2 | 3.2 | | | 2.7 | |
| Side | | | | | | |
| SL(mm) | 73 | 73 | 73 | 73 | 61 | 73 |
| T2(mm) | 6 | 6 | 12 | 19 | 6 | 8 |
| E2*(MPa) | 12 | 8 | 12 | 12 | 8 | 12 |
| tan δ | 0.1 | 0.1 | 0.05 | 0.05 | 0.1 | 0.05 |
| SL/TW | 0.4 | 0.4 | 0.39 | 0.39 | 0.3 | 0.39 |
| T2/TW(%) | 3.2 | 3.2 | 6.5 | 10.3 | 3.2 | 4.3 |
| Buttress | | | | | | |
| BL(mm) | | | | | 34 | 61 |
| T3(mm) | | | | | 5 | 6 |
| E3*(MPa) | non | non | non | non | 12 | 12 |
| tan δ | | | | | 0.1 | 0.05 |
| BL/TW | | | | | 0.2 | 0.33 |
| T3/TW(%) | | | | | 2.7 | 3.2 |
| Running distance (km) | 230 | 160 | 33 | 70 | 230 | 120 |
| Ride comfort | 2.8 | 3 | 2.9 | 2.5 | 3 | 2.5 |
| Tire weight | 12 | 12 | 12.5 | 13.3 | 13 | 12.5 |

I claim:

1. A pneumatic tire comprising a tread portion, a pair of sidewall portions, a pair of bead portions, a carcass comprising at least three radial plies each extending between the bead portions through the tread portion and sidewall portions, the tread portion provided between the radially outermost carcass ply and radially inner next carcass ply with a crown reinforcing rubber layer so that at least two carcass plies are disposed radially inside the crown reinforcing rubber layer, and each sidewall portion provided between the axially innermost carcass ply and axially outer next carcass ply with a side reinforcing rubber layer so that at least two carcass plies are disposed axially outside the side reinforcing rubber layer.

2. The pneumatic tire according to claim 1, wherein each said bead portion is provided with a bead core, and the radially outermost carcass ply is turned up around the bead cores in the bead portions to define a pair of turnup portions and a main portion therebetween, but the remaining carcass plies are not turned up to terminate axially inside the main portion of the outermost carcass ply.

3. The pneumatic tire according to claim 2, wherein the reinforcing rubber layers are made of a low heat generation rubber having a complex elastic modulus of 8 to 15 MPa and a loss tangent of 0.03 to 0.08, both measured at a temperature of 70° C., a frequency of 10 Hz, an initial strain of 10%, and a dynamic distortion of ±2%.

4. The pneumatic tire according to claim 2, wherein the complex elastic modulus of the side reinforcing rubber layer is less than the complex elastic modulus of the crown reinforcing rubber layer.

5. The pneumatic tire according to claim 2, wherein said at least three radial plies of the carcass are four plies, and a buttress reinforcing rubber layer is further disposed between the crown reinforcing rubber layer and each of the side reinforcing rubber layers so that the carcass is provided between the four plies with the reinforcing rubber layers changing their positions from the outside to inside of the tire when viewed along the carcass from the tire equator to the bead portions.

6. The pneumatic tire according to claim 1, wherein the reinforcing rubber layers are made of a low heat generation rubber having a complex elastic modulus of 8 to 15 MPa and a loss tangent of 0.03 to 0.08, both measured at a temperature of 70° C., a frequency of 10 Hz, an initial strain of 10%, and a dynamic distortion of ±2%.

7. The pneumatic tire according to claim 6, wherein the complex elastic modulus of the side reinforcing rubber layer is less than the complex elastic modulus of the crown reinforcing rubber layer.

8. The pneumatic tire according to claim 6, wherein said at least three radial plies of the carcass are four plies, and a buttress reinforcing rubber layer is further disposed between the crown reinforcing rubber layer and each of the side reinforcing rubber layers so that the carcass is provided between the four plies with the reinforcing rubber layers changing their positions from the outside to inside of the tire when viewed along the carcass from the tire equator to the bead portions.

9. The pnuematic tire according to claim 1, wherein the complex elastic modulus of the side reinforcing rubber layer is less than the complex elastic modulus of the crown reinforcing rubber layer.

10. The pneumatic tire according to claim 9, wherein said at least three radial plies of the carcass are four plies, and a buttress reinforcing rubber layer is further disposed between the crown reinforcing rubber layer and each of the side reinforcing rubber layers so that the carcass is provided between the four plies with the reinforcing rubber layers changing their positions from the outside to inside of the tire when viewed along the carcass from the tire equator to the bead portions.

11. The pneumatic tire according to claim 1, wherein said at least three radial plies of the carcass are four plies, and a buttress reinforcing rubber layer is further disposed between the crown reinforcing rubber layer and each of the side reinforcing rubber layers so that the carcass is provided between the four plies with the reinforcing rubber layers changing their positons from the outside to inside of the tire when viewed along the carcass from the tire equator to the bead portions.

* * * * *